US012583351B2

(12) United States Patent
Wu et al.

(10) Patent No.: US 12,583,351 B2
(45) Date of Patent: Mar. 24, 2026

(54) METHOD FOR MONITORING AN ELECTRIC VEHICLE CHARGING APPARATUS, AND ELECTRIC VEHICLE CHARGING APPARATUS IMPLEMENTING THE SAME

(71) Applicant: METAL INDUSTRIES RESEARCH AND DEVELOPMENT CENTRE, Kaohsiung (TW)

(72) Inventors: Hsien-Ju Wu, Kaohsiung (TW); Chun-Chieh Chiu, Kaohsiung (TW); Tai-Chang Chen, Kaohsiung (TW); Jinn-Feng Jiang, Kaohsiung (TW); Chia-Lung Huang, Kaohsiung (TW); Mei-Jung Chen, Kaohsiung (TW)

(73) Assignee: METAL INDUSTRIES RESEARCH AND DEVELOPMENT CENTRE, Kaohsiung (TW)

( * ) Notice: Subject to any disclaimer, the term of this patent is extended or adjusted under 35 U.S.C. 154(b) by 390 days.

(21) Appl. No.: 18/500,900

(22) Filed: Nov. 2, 2023

(65) Prior Publication Data

US 2025/0145040 A1     May 8, 2025

(51) Int. Cl.
| | |
|---|---|
| *G05B 11/00* | (2006.01) |
| *B60L 53/16* | (2019.01) |
| *B60L 53/31* | (2019.01) |
| *B60L 53/62* | (2019.01) |
| *H02J 7/00* | (2006.01) |

(52) U.S. Cl.
CPC ............... *B60L 53/62* (2019.02); *B60L 53/16* (2019.02); *B60L 53/31* (2019.02); *H02J 7/007192* (2020.01)

(58) Field of Classification Search
CPC .......... B60L 53/62; B60L 53/16; B60L 53/31; H02J 7/007192; Y02T 10/70; Y02T 10/7072; Y02T 90/12
See application file for complete search history.

(56) References Cited

U.S. PATENT DOCUMENTS

| | | | | |
|---|---|---|---|---|
| 2023/0127745 A1* | 4/2023 | Lee | .......................... | B60L 53/16 |
| | | | | 320/109 |
| 2023/0382254 A1* | 11/2023 | Wang | ...................... | B60L 53/14 |
| 2023/0406134 A1* | 12/2023 | Wang | ...................... | B60L 53/62 |
| 2025/0074228 A1* | 3/2025 | Yeruva | .................. | B60L 53/302 |

* cited by examiner

*Primary Examiner* — Aleksey Olshannikov
(74) *Attorney, Agent, or Firm* — HSML P.C.

(57) ABSTRACT

A method for monitoring an electric vehicle charging apparatus is provided. A charging pile that includes a power meter and a processor is used to provide a charging current to an electric vehicle through a charging connector. The power meter detects the charging current to generate an initial current value and an initial power value that correspond to an initial charging time, and a present current value and a present power value that correspond to a present time, so that the processor calculates an initial resistance value and a present resistance value of the charging connector accordingly, and then calculates an estimated present temperature value of the charging connector based on the initial resistance value and the present resistance value. The estimated present temperature value is compared with an over-temperature threshold to determine whether to reduce the charging current.

12 Claims, 2 Drawing Sheets

METHOD FOR MONITORING AN ELECTRIC VEHICLE CHARGING APPARATUS, AND ELECTRIC VEHICLE CHARGING APPARATUS IMPLEMENTING THE SAME

FIELD

The disclosure relates to an electric vehicle charging technology, and more particularly to a method for monitoring a temperature of an electric vehicle charging apparatus, and the electric vehicle charging apparatus.

BACKGROUND

Conventional charging technology for electric vehicles can be categorized into alternating current (AC) slow charging and direct current (DC) fast charging. AC slow charging involves using an on-board charger (OBC) of an electric vehicle to convert AC power supplied by a charging pile (also known as charging station) into DC power for battery charging. However, OBCs have size and weight constraints, making them unable to provide high-power fast charging services. On the other hand, DC fast charging directly converts AC power at a charging pile into DC power, bypassing the need for an OBC. With the charging pile having less size restrictions than OBCs, multiple charging modules can be used to increase charging power for faster charging. Nevertheless, one issue with DC fast charging is the high temperature generated by a charging gun during the charging process, which is a potential fire hazard.

SUMMARY

Therefore, a current research focus is on how to provide high-power fast charging services while ensuring safety. An object of the disclosure is to provide a method for monitoring an electric vehicle charging apparatus that can alleviate at least one of the drawbacks of the prior art by monitoring a temperature of the electric vehicle charging apparatus in real time.

According to the disclosure, the electric vehicle charging apparatus includes a charging pile and a charging connector. The charging pile is connected to the charging connector, and includes a power meter and a processor. The charging connector is connected to the electric vehicle for providing a charging current from the charging pile to the electric vehicle. The method includes steps of: A) by the power meter, detecting the charging current to generate an initial current value and an initial power value that correspond to an initial charging time, and a present current value and a present power value that correspond to a present time; B) by the processor, calculating an initial resistance value of the charging connector based on the initial current value and the initial power value; C) by the processor, calculating a present resistance value of the charging connector based on the present current value and the present power value; D) by the processor, calculating an estimated present temperature value of the charging connector based on a predetermined temperature coefficient of resistance (TCR) that corresponds to the charging connector, an initial temperature value that is related to an ambient temperature, the initial resistance value, and the present resistance value; and E) by the processor, comparing the estimated present temperature value with an over-temperature threshold to generate a comparison result, and determining whether to reduce the charging current based on the comparison result.

Another object of the disclosure is to provide an electric vehicle charging apparatus for charging an electric vehicle.

According to the disclosure, the electric vehicle charging apparatus includes a charging connector and a charging pile. The charging connector is to be electrically connected to the electric vehicle. The charging pile is electrically connected to the charging connector for providing a charging current through the charging connector, and includes a power supply device, a power meter, and a processor. The power supply device is operable to output and adjust the charging current. The power meter is electrically connected to the power supply device for detecting the charging current, and is configured to detect the charging current to generate an initial current value and an initial power value that correspond to an initial charging time, and a present current value and a present power value that correspond to a present time. The processor is electrically connected to the power meter for receiving the initial current value, the initial power value, the present current value and the present power value, and is configured to calculate an initial resistance value of the charging connector based on the initial current value and the initial power value, and to calculate a present resistance value of the charging connector based on the present current value and the present power value. The processor is configured to calculate an estimated present temperature value of the charging connector based on a predetermined temperature coefficient of resistance (TCR) that corresponds to the charging connector, an initial temperature value that is related to an ambient temperature, the initial resistance value, and the present resistance value. The processor is configured to compare the estimated present temperature value with an over-temperature threshold to generate a comparison result, and to determine whether to reduce the charging current based on the comparison result.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
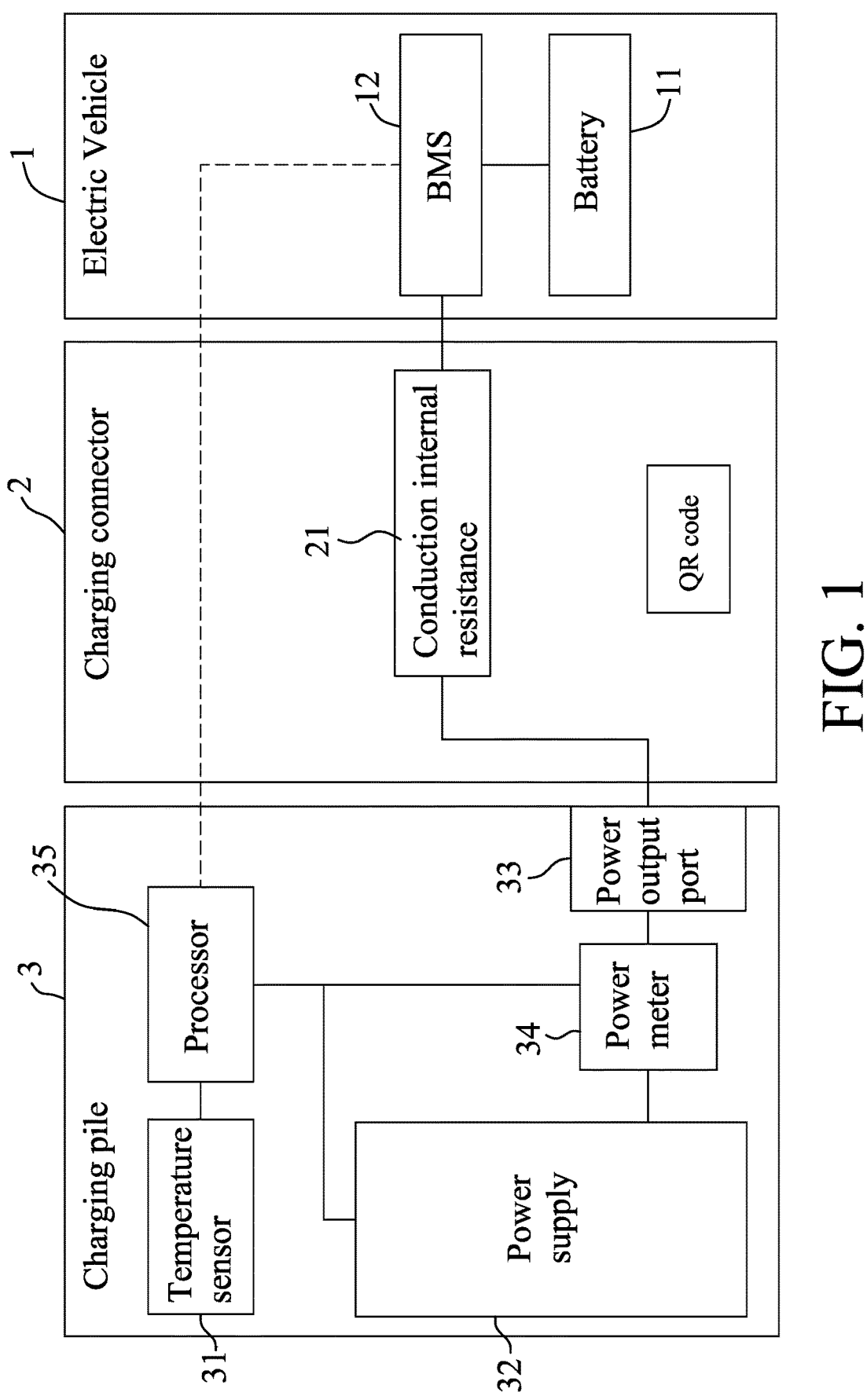
FIG. 1 is a block diagram illustrating an embodiment of an electric vehicle charging apparatus according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an embodiment of an electric vehicle charging apparatus according to this disclosure is shown to be electrically connected to an electric vehicle 1 and include a charging connector 2 and a charging pile 3. The charging connector 2 is connected between the electric vehicle 1 and the charging pile 3, and may be realized as a combination of a charging cable and a charging gun in this embodiment. In this embodiment, a quick response code (QR code) that records a predetermined temperature coefficient of (electric) resistance (TCR) may be attached to a housing of the charging connector 2, where the predetermined TCR corresponds to the charging connector 2 (e.g., relating to a TCR of the charging cable) that has a conduction internal resistance 21 which may cause a temperature of the charging connector 2 to rise with a current flowing through the charging connector 2, and the rise of the temperature may be related to a magnitude of the current and a length of time the current flows through the charging connector 2. The charging pile 3 may include a scanning interface (e.g. a QR code scanner or a camera, not shown) to read the QR code and send the predetermined TCR obtained from the QR code to a processor 35 of the charging pile 3 for use thereby. Every time the charging connector 2 is replaced, the QR code that is attached to the new (replacement) charging connector 2 should be read using the scanning interface to update the predetermined TCR that is used by the processor 35. The electric vehicle 1 includes a battery 11 that is rechargeable, and a battery management system (BMS) 12 that monitors charging and discharging of the battery 11, so as to prevent abnormal conditions, such as over-discharging, overcharging, overheating, etc.

The charging pile 3 includes a temperature sensor 31, a power supply device 32, a power output port 33, a power meter 34 and the processor 35. The temperature sensor 31 is disposed on a shell of the charging pile 3 at a location which would not be subjected to direct exposure to sunlight, so as to accurately acquire an ambient temperature before the electric vehicle charging apparatus is activated. The power supply device 32 includes an insulated gate bipolar transistor (IGBT) that is operable to generate and adjust a charging current. The power output port 33 is configured for connection with the charging connector 2, so as for the charging current from the power supply device 32 to be transmitted to the electric vehicle 1 through the charging connector 2. The processor 35 (e.g., a central processing unit, CPU) is electrically connected to the temperature sensor 31, the power supply device 32 and the power meter 34, and is configured to be communicatively connected to the battery management system 12 when the charging connector 2 is connected to the electric vehicle 1, so as perform handshake communication with the battery management system 12. For example, the battery management system 12 may transmit to the processor 35 a request signal that signifies required power for charging the battery 11, and the processor 35 returns a confirmation signal to the battery management system 12 upon receipt of the request signal, and then controls the power supply device 32 to provide the charging current that corresponds to the required power to charge the battery 11 through the charging connector 2 and the battery management system 12. During the transmission of the charging current, a part of electric power may be consumed by the conduction internal resistance 21 of the charging connector 2, so the power actually received by the battery 11 would be less than the required power. The battery management system 12 would generate and send to the processor 35 a power report that indicates the power actually received by the battery 11. The processor 35 receives, from the power meter 34, output power information that indicates power outputted by the power supply device 32, and compares the power actually received by the battery 11 with the power outputted by the power supply device 32 to obtain a power difference therebetween. Upon determining that the power difference is greater than a power difference threshold, which means there is an excessive power loss at the charging connector 2, the processor 35 controls the power supply device 32 to stop output of electricity to terminate the charging of the electric vehicle 1.

Figure 2:
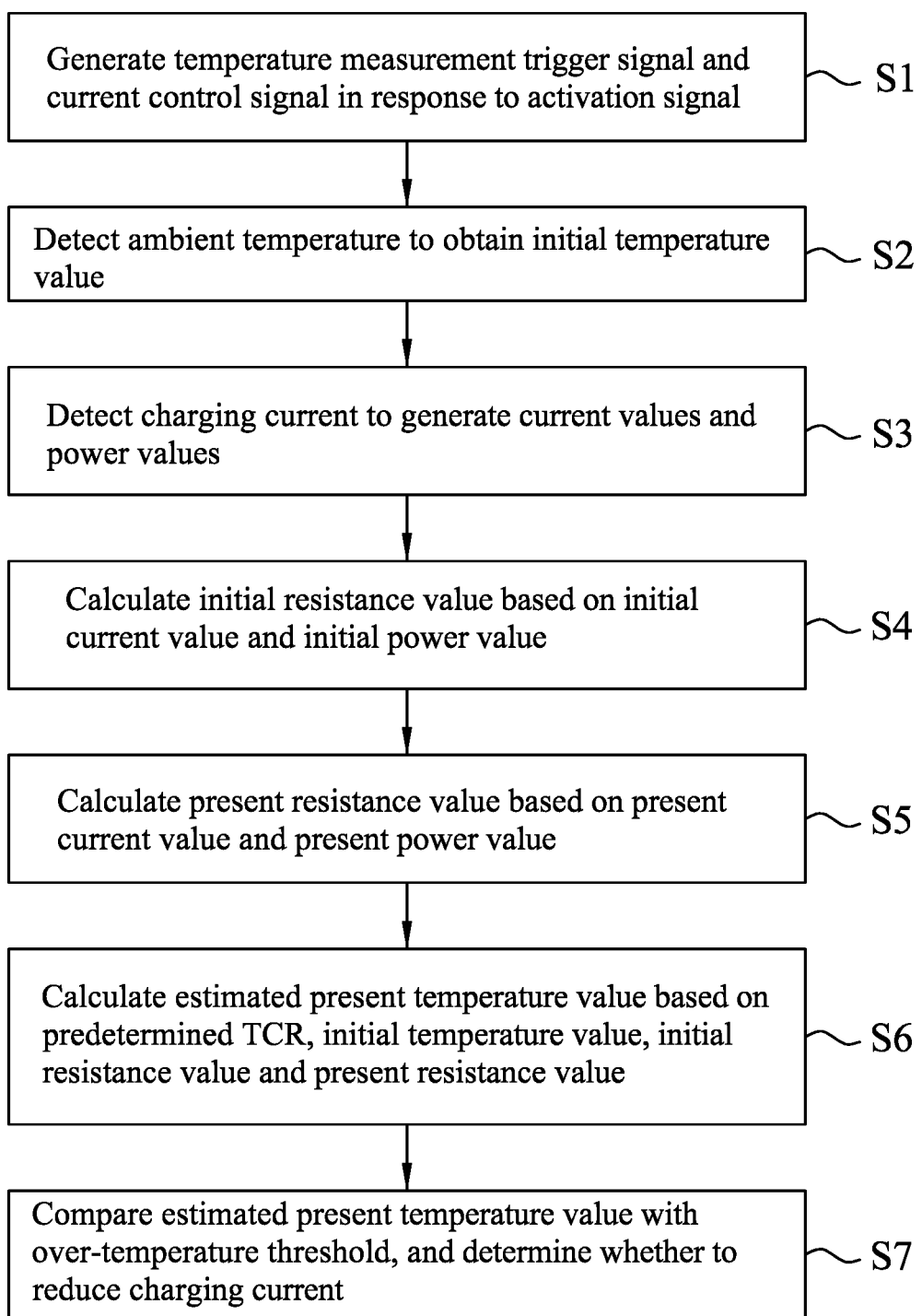
FIG. 2 is a flow chart illustrating an embodiment of a method for monitoring an electric vehicle charging apparatus according to the disclosure.

Further referring to FIG. 2, an embodiment of a method for monitoring an electric vehicle charging apparatus includes steps S1 to S7.

In step S1, the processor 35 generates a temperature measurement trigger signal and a current control signal in response to receipt of an activation signal that is generated by a user operating the charging pile 3, where the temperature measurement trigger signal is sent to the temperature sensor 31 to trigger measurement of the ambient temperature, and the current control signal is to control the power supply device 32 to output and adjust the charging current.

In step S2, in response to the temperature measurement trigger signal, the temperature sensor 31 detects/measures the ambient temperature that serves as an initial temperature value of the charging connector 2 at a time the charging pile 3 begins to output the charging current (referred to as "initial charging time" hereinafter), where the initial temperature value is related to the conduction internal resistance 21 of the charging connector 2. In practice, the initial charging time may be defined to be a time instant that is a predetermined length of time later than a time instant the processor 35 receives the activation signal.

In step S3, the power meter 34 detects/measures the charging current to generate an initial current value and an initial power value that correspond to the initial charging time, and a present current value and a present power value that correspond to a present time. In one example, the initial current value may be obtained by averaging multiple current values of the charging current that are sampled within a predetermined period of time (e.g., five seconds) after the charging becomes stable (e.g., the charging current becoming stable), and the initial power value can be obtained based on the initial current value.

In step S4, the processor 35 receives the initial current value and the initial power value from the power meter 34, and calculates an initial resistance value of the conduction internal resistance 21 based on the initial current value and the initial power value. In one example, the calculation is according to:

$$R_{ref} = \frac{P_{ref}}{I_{ref}^2},$$

where $R_{ref}$ represents the initial resistance value, $P_{ref}$ represents the initial power value, and $I_{ref}$ represents the initial current value.

In step S5, the processor 35 receives the present current value and the present power value from the power meter 34, and calculates a present resistance value of the conduction internal resistance 21 based on the present current value and the present power value. In one example, the calculation is according to the above equation, with $R_{ref}$ representing the present resistance value, $P_{ref}$ representing the present power value, and $I_{ref}$ representing the present current value.

In step S6, based on the predetermined TCR received from the scanning interface, the initial temperature value received from the temperature sensor 31, the initial resistance value and the present resistance value, the processor 35 calculates an estimated present temperature value of the charging connector 2 that is related to the conduction internal resistance 21. In one example, the calculation may be performed according to:

$$T = \frac{1}{\alpha}\left(\frac{R}{R_{ref}} - 1\right) + T_{ref},$$

where T represents the estimated present temperature value, $\alpha$ represents the predetermined TCR, R represents the present resistance value, $R_{ref}$ represents the initial resistance value, and $T_{ref}$ represents the initial temperature value.

In step S7, the processor 35 compares the estimated present temperature value with an over-temperature threshold to generate a comparison result, and determines whether to reduce the charging current based on the comparison result, where the over-temperature threshold is predetermined based on thermal design and materials of the charging connector 2 (including the charging gun and the charging cable). In detail, when the estimated present temperature value is greater than the over-temperature threshold, the processor 35 causes the current control signal to include an instruction that makes the power supply device 32 reduce the charging current to, for example, 20% of a present magnitude, so that the power supply device 32 reduces the charging current according to the instruction; and when the estimated present temperature value is not greater than the over-temperature threshold, the processor 35 causes the current control signal to include an instruction that makes the power supply device 32 maintain the charging current at the present magnitude, so that the power supply device 32 does not reduce the charging current according to the instruction.

In summary, the embodiment uses the predetermined TCR, the initial temperature value, the initial resistance value and the present resistance value to calculate the estimated present temperature value of the charging connector 2, thus attaining real-time monitoring of the temperature of the electric vehicle charging apparatus. When the estimated present temperature is greater than the over-temperature threshold, the charging current is reduced, so as to protect the electric vehicle charging apparatus from overheating damage, achieving a balance between safety and high-power fast charging service.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for monitoring an electric vehicle charging apparatus that includes a charging pile and a charging connector, the charging pile being connected to the charging connector, and including a power meter and a processor, the charging connector being connected to the electric vehicle for providing a charging current from the charging pile to the electric vehicle, said method comprising steps of:

A) by the power meter, detecting the charging current to generate an initial current value and an initial power value that correspond to an initial charging time, and a present current value and a present power value that correspond to a present time;

B) by the processor, calculating an initial resistance value of the charging connector based on the initial current value and the initial power value;

C) by the processor, calculating a present resistance value of the charging connector based on the present current value and the present power value;

D) by the processor, calculating an estimated present temperature value of the charging connector based on a predetermined temperature coefficient of resistance (TCR) that corresponds to the charging connector, an initial temperature value that is related to an ambient temperature, the initial resistance value, and the present resistance value; and E) by the processor, comparing the estimated present temperature value with an over-temperature threshold to generate a comparison result, and determining whether to reduce the charging current based on the comparison result.

2. The method as claimed in claim 1, wherein, in step B), the processor calculates the initial resistance value according to:

$$R_{ref} = \frac{P_{ref}}{I_{ref}^2},$$

where $R_{ref}$ represents the initial resistance value, $P_{ref}$ represents the initial power value, and $I_{ref}$ represents the initial current value.

3. The method as claimed in claim 1, wherein, in step D), the processor calculates the estimated present temperature value according to:

$$T = \frac{1}{\alpha}\left(\frac{R}{R_{ref}} - 1\right) + T_{ref},$$

where T represents the estimated present temperature value, $\alpha$ represents the predetermined TCR, R represents the present resistance value, $R_{ref}$ represents the initial resistance value, and $T_{ref}$ represents the initial temperature value.

4. The method as claimed in claim 1, the predetermined TCR is recorded in a quick response (QR) code, said method further comprising a step of:

by a scanning interface of the charging pile, scanning the QR code to read the predetermined TCR, and sending the predetermined TCR to the processor.

5. The method as claimed in claim 1, the charging pile further including a power supply device, said method further comprising, before step A), a step of, by the processor, generating, in response to receipt of an activation signal, a temperature measurement trigger signal to trigger measurement of the ambient temperature, and a current control signal to control the power supply device to output and adjust the charging current.

6. The method as claimed in claim 5, wherein the initial charging time is a time instant that is a predetermined length of time later than a time instant the processor receives the activation signal.

7. The method as claimed in claim 5, wherein step E) includes, by the processor, when the estimated present temperature value is greater than the over-temperature threshold, causing the current control signal to include an instruction that makes the power supply device reduce the charging current.

8. The method as claimed in claim 5, wherein step E) includes, by the processor, when the estimated present temperature value is not greater than the over-temperature threshold, causing the current control signal to include an instruction that makes the power supply device maintain the charging current at a present magnitude.

9. The method as claimed in claim 5, the charging pile further including a temperature sensor, said method further comprising, before step A), a step of, by the temperature sensor, in response to the temperature measurement trigger signal received from the processor, sensing the ambient temperature to obtain the initial temperature value.

10. An electric vehicle charging apparatus for charging an electric vehicle, comprising:

a charging connector to be electrically connected to the electric vehicle; and a charging pile electrically connected to said charging connector for providing a charging current to the electric vehicle through said charging connector, said charging pile including:

a power supply device operable to output and adjust the charging current;

a power meter electrically connected to said power supply device for detecting the charging current, and configured to detect the charging current to generate an initial current value and an initial power value that correspond to an initial charging time, and a present current value and a present power value that correspond to a present time; and a processor electrically connected to said power meter for receiving the initial current value, the initial power value, the present current value and the present power value, and configured to calculate an initial resistance value of said charging connector based on the initial current value and the initial power value, and to calculate a present resistance value of said charging connector based on the present current value and the present power value;

wherein said processor is configured to calculate an estimated present temperature value of said charging connector based on a predetermined temperature coefficient of resistance (TCR) that corresponds to said charging connector, an initial temperature value that is related to an ambient temperature, the initial resistance value, and the present resistance value; and wherein said processor is configured to compare the estimated present temperature value with an over-temperature threshold to generate a comparison result, and to determine whether to reduce the charging current based on the comparison result.

11. The electric vehicle charging apparatus as claimed in claim 10, wherein said processor is configured to, when the estimated present temperature value is greater than the over-temperature threshold, control said power supply device to reduce the charging current.

12. The electric vehicle charging apparatus as claimed in claim 11, wherein said processor is configured to, when the estimated present temperature value is not greater than the over-temperature threshold, control said power supply device to maintain the charging current at a present magnitude.

* * * * *